United States Patent
Sandoghchi et al.

(10) Patent No.: US 12,545,617 B2
(45) Date of Patent: Feb. 10, 2026

(54) METHOD FOR PROCESSING GLASS FILAMENT

(71) Applicant: Microsoft Technology Licensing, LLC, Redmond, WA (US)

(72) Inventors: Seyed Reza Sandoghchi, Romsey (GB); Peter Charles Shardlow, Romsey (GB); Andrew Paul Appleyard, Romsey (GB); Andrew Thomas Harker, Romsey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 395 days.

(21) Appl. No.: 17/785,130

(22) PCT Filed: Dec. 9, 2020

(86) PCT No.: PCT/GB2020/053147
§ 371 (c)(1),
(2) Date: Jun. 14, 2022

(87) PCT Pub. No.: WO2021/123738
PCT Pub. Date: Jun. 24, 2021

(65) Prior Publication Data
US 2023/0011708 A1 Jan. 12, 2023

(30) Foreign Application Priority Data
Dec. 17, 2019 (GB) ...................... 1918628

(51) Int. Cl.
*C03B 37/012* (2006.01)
(52) U.S. Cl.
CPC .... *C03B 37/01208* (2013.01); *C03B 37/0124* (2013.01); *C03B 37/0126* (2013.01)

(58) Field of Classification Search
CPC ............ C03B 37/01208; C03B 23/047; C03B 37/012; C03B 37/0124; C03B 2205/04;
(Continued)

(56) References Cited

U.S. PATENT DOCUMENTS 4,058,699 A * 11/1977 van Vloten .............. G02B 5/10
117/222
4,188,201 A * 2/1980 Jung ................. C03B 37/01294
65/335

(Continued)

FOREIGN PATENT DOCUMENTS

CN 1668541 A 9/2005
CN 102875019 A * 1/2013 ....... C03B 37/01807

(Continued)

OTHER PUBLICATIONS

Office Action Received for Singapore Application No. 11202250408G, mailed on Apr. 23, 2024, 2 pages.

(Continued)

*Primary Examiner* — Erin Snelting
*Assistant Examiner* — Steven S Lee (57) ABSTRACT

A method of processing glass filament comprises: providing a length of glass filament from which a portion is to be separated from the remainder of the filament; directing energy onto the filament in order to cause a decrease in a width of the filament at a desired location for separation of the portion; and causing relative longitudinal movement between the portion and the remainder of the filament to separate the portion from the remainder of the filament at the desired location.

20 Claims, 8 Drawing Sheets

(58) Field of Classification Search
CPC ......... C03B 17/04; C03B 23/04; C03B 23/05; C03B 23/07; C03B 23/08; C03B 23/09; C03B 23/00; C03B 37/00; C03B 33/09; C03B 37/0122; G02B 6/02328

See application file for complete search history.

(56) References Cited

U.S. PATENT DOCUMENTS

| | | | | |
|---|---|---|---|---|
| 4,197,157 | A | * | 4/1980 | Haggerty ........... B23K 26/0643 117/936 |
| 5,894,537 | A | * | 4/1999 | Berkey ............. C03B 37/01493 385/123 |
| 6,386,001 | B1 | * | 5/2002 | Shimizu ........... C03B 37/01202 65/435 |
| 6,539,154 | B1 | * | 3/2003 | Berkey ................ C03C 25/002 385/121 |
| 6,742,363 | B1 | | 6/2004 | Yamamura |
| 2003/0126891 | A1 | | 7/2003 | Suzuki |
| 2004/0020906 | A1 | | 2/2004 | Ohta |
| 2004/0177652 | A1 | | 9/2004 | Yamamura |
| 2012/0207439 | A1 | * | 8/2012 | Okada .................. C03B 37/032 427/163.2 |
| 2014/0332510 | A1 | | 11/2014 | Danley |
| 2017/0001901 | A1 | * | 1/2017 | Ganz ..................... C03B 23/047 |
| 2017/0283299 | A1 | * | 10/2017 | Bookbinder ........ C03B 33/0955 |
| 2018/0267235 | A1 | * | 9/2018 | Russell ............. C03B 37/02781 |
| 2019/0099838 | A1 | * | 4/2019 | Rieske ................... B23K 26/40 |

FOREIGN PATENT DOCUMENTS

| | | | | |
|---|---|---|---|---|
| DE | 10392917 | B4 | 12/2012 | |
| EP | 0887318 | A1 * | 12/1998 | ............. C03B 29/14 |
| JP | S58189601 | A | 11/1983 | |
| JP | H01111972 | A | 4/1989 | |
| JP | H0346602 | A | 2/1991 | |
| JP | H08198632 | A | 8/1996 | |
| JP | H08310826 | A | 11/1996 | |
| JP | H11130455 | A * | 5/1999 | ......... C03B 37/0124 |
| JP | 2000063140 | A * | 2/2000 | ......... C03B 37/0124 |
| JP | 3016557 | B1 * | 3/2000 | ......... C03B 37/0124 |
| JP | 2000072467 | A * | 3/2000 | ......... C03B 37/0124 |
| JP | 2001245728 | A | 9/2001 | |
| JP | 2001254159 | A | 9/2001 | |
| JP | 2004203670 | A * | 7/2004 | ........... C03B 23/043 |
| JP | 2005119933 | A * | 5/2005 | ......... C03B 37/0126 |
| JP | 2007031199 | A | 2/2007 | |
| WO | 99/59766 | | 11/1999 | |

OTHER PUBLICATIONS

Second Office Action Received for Chinese Application No. 202080088120.5, mailed on Apr. 30, 2024, 15 pages (English Translation Provided).
Communication under Rule 71(3) EPC Received for European Application No. 20828064.4 mailed on Oct. 31, 2023, 9 pages.
Office Action Received for Chinese Application No. 202080088120.5, mailed on Sep. 27, 2023, 11 pages (English Translation Provided).
Third Office Action Received for Chinese Application No. 202080088120.5, mailed on Sep. 5, 2024, 7 pages. (English Translation Provided).
Notice of Reasons for Refusal for Japanese Application No. 2022-537160, mailed on Feb. 12, 2025, 6 pages (English translation provided).
International Search Report and Written Opinion for Priority International Application No. PCT/GB2020/053147, mailed on Feb. 23, 2021.
Combined Search and Examination Report issued by the Great Britain Intellectual Property Office for Priority United Kingdom Patent Application No. GB1918628.7, mailed Apr. 30, 2020.
Decision to Grant a Patent Received for Japanese Application No. 2022-537160, mailed on Jun. 3, 2025, 05 pages. (English Translation Provided).
Communication under Rule 97(1) EPC Received for European Application No. 20828064.4 mailed on Feb. 15, 2024, 02 pages.
Decision to Grant received in Chinese Application No. 202080088120.5, mailed on Nov. 9, 2024, 4 pages.
Office Action Received for Japanese Application No. 2022-537160 mailed on Sep. 30, 2024, 8 pages. (English translation Provided).
Office Action Received for Singapore Application No. 11202250408G, mailed on Nov. 14, 2024, 2 pages.

* cited by examiner

METHOD FOR PROCESSING GLASS FILAMENT

This application is a national phase of International Application No. PCT/GB2020/053147, filed Dec. 9, 2020, which claims priority to United Kingdom Application No. 1918628.7, filed Dec. 17, 2019, each of which is hereby incorporated herein by reference in its entirety.

BACKGROUND OF THE INVENTION

The present invention relates to methods for processing glass filament, in particular for separating portions such as canes from a glass filament. The glass filament may be filament for forming optical fibre.

Optical fibres are typically manufactured by assembling a plurality of glass components into a preform assembly, which has a cross-sectional structure corresponding to the desired structure for the fibre, and a much greater diameter than the desired fibre diameter. The preform is "drawn down" in a fibre drawing tower by heating the preform to soften the glass and pulling a continuous filament from it, maintaining the same cross-section but at a reduced diameter. The smaller diameter may be the intended fibre diameter, but commonly the diameter is intermediate between the preform size and the intended fibre size. In the latter case, the filament is separated into shorter portions, conveniently carried out as the filament is drawn from the preform. The shorter portions are termed canes, and in turn will be drawn down into a continuous filament of optical fibre.

Originally, optical fibres had a solid structure, so that the preform comprised a solid glass rod corresponding to the desired cross-section of the core and inner cladding for the finished fibre, inserted into a hollow tube destined to form the fibre's outer cladding. More recent fibre designs employ longitudinal holes or lumina that extend the length of the fibre and define the structure of either or both of the core and the inner cladding. A preform for such fibres can be made by stacking hollow tubes and capillaries, and optionally solid rods, into the desired cross-sectional pattern.

One technique for separating a filament into individual canes is known as cleaving, which is a mechanical technique also suitable for preparing the end faces of optical fibres. A notch, scratch, crack or score is formed in the outer glass surface of the filament (using a saw, abrasive wheel, diamond blade, ceramic blade or steel blade, for example), and a tensile stress is induced in excess of the tensile strength of the glass in a region adjacent to the tip of the notch. This causes the notch to propagate through the glass, thereby separating a cane from the remainder of the filament at the position of the notch. Cleaving is able to produce end surfaces which are flat, smooth, and at a controlled angle, such as perpendicular, to the longitudinal axis of the filament, and with edges that are generally clean and free from chips or blemishes (expect, generally, at the position of the notch). Nevertheless, cleaving and other mechanical techniques can be problematic for the separation of canes from a filament. If chips or blemishes do arise at the cleaved surfaces, it may not be possible to successfully draw the cane into a fibre, because cracks may propagate from the flaws. Also, debris may be deposited on and around the cane end. This is a particular risk for fibre structures comprising one or more lumina, since debris may enter the lumina. Debris can cause defects in fibre subsequently drawn from the cane, which may manifest as increased optical loss or mechanical weakness of the fibre. All these issues can require the scrappage of significant lengths of fibre and cane, thus reducing yield and increasing cost.

An additionally issue is potential perturbation of the glass filament if cane separation is carried out in a draw tower as the filament is formed. Perturbation may locally change the diameter of the cane from the desired diameter.

Accordingly, alternative methods of processing glass filament to separate canes from the filament are of interest.

SUMMARY OF THE INVENTION

Aspects and embodiments are set out in the appended claims.

According to a first aspect of certain embodiments described herein, there is provided a method of processing glass filament, comprising: providing a length of glass filament from which a portion is to be separated from the remainder of the filament; directing energy onto the filament in order to cause a decrease in a width of the filament at a desired location for separation of the portion; and moving the portion away from the remainder of the filament to obtain the portion separated from the remainder of the filament.

According to a second aspect of certain embodiments described herein, there is provided a cane suitable for drawing into an optical fibre and which has been obtained by separation from a glass filament using a method according the first aspect.

According to a third aspect of certain embodiments described herein, there is provided a device for drawing glass filament from a preform, comprising: a pair of rotatable belts each having a movable surface rotatable about an axis of rotation, the belts arrangeable into positions in which the movable surfaces are facing with a separation to receive and grip the glass filament, movement of the surfaces acting to pull the filament away from the preform along a direction of a longitudinal axis of the filament; in which the axes of rotation of the belts are locatable at opposite and substantially equal non-orthogonal angles to the pull direction, in order to impart a rotation to the filament about its longitudinal axis.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods and apparatus may be provided in accordance with approaches described herein which include any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure presents methods for processing glass filament by separating a cane for forming into optical fibre from the remainder of a length of the filament, using the application of energy in place of mechanical techniques known to produce debris and flawed end surfaces that compromise the quality of optical fibre drawn from the cane. The use of energy for cane separation can produce clean end surfaces substantially free from debris and flaws, and in some cases closed to prevent the ingress of contaminants. Also, mechanical techniques such as cleaving can be poorly suited for cutting through larger diameters of filament, whereas the energy-based approaches can be adapted to filament diameter by appropriate selection of the energy characteristics.

Figure 1:
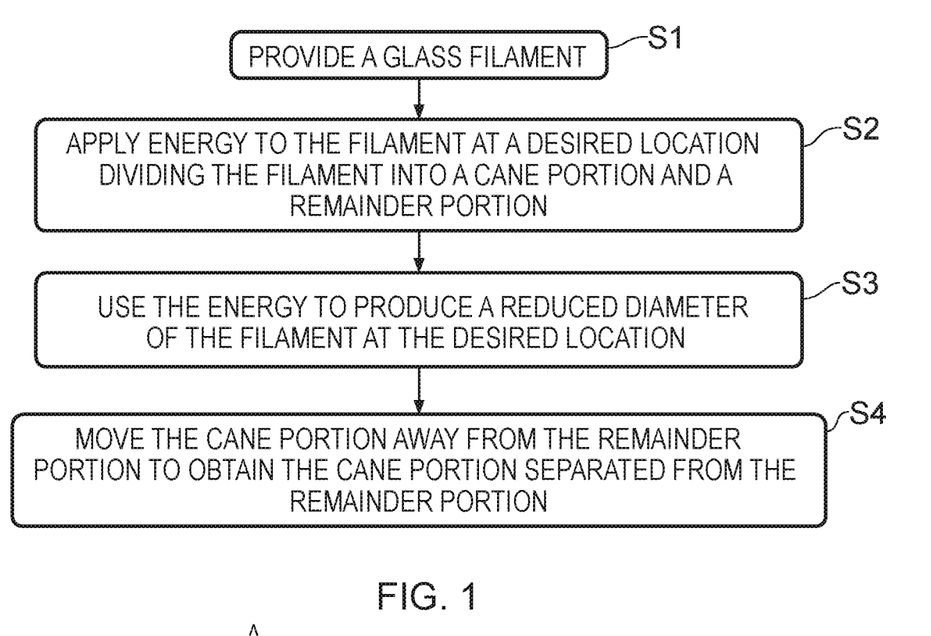
FIG. 1 shows a flow chart of a method for processing a glass filament according to an example of the present disclosure.

FIG. 1 shows a flow chart setting out steps in an example method for glass filament processing as described herein. In a first step S1, the method comprises providing a glass filament. This is a length of filament, formed from a glass material such as fused silica, that has a cross-sectional structure appropriate to a desired structure for an optical fibre but having a larger diameter than that intended for the fibre. The filament will typically have been fabricated by drawing it from a glass preform or preform assembly, which, again, has an appropriate structure but on a still larger scale, and which is produced by stacking and otherwise arranging glass tubes, capillaries and rods to form the desired structure. Drawing a filament from a preform can be carried out in a draw tower, as will be understood by the skilled person. In order to make the final optical fibre, the filament will be divided or separated into individual shorter lengths or portions, which can be termed "canes", each of which can be drawn into optical fibre. The method of FIG. 1 shows steps to achieve separation of a cane from the rest of the filament, and may be carried out within a draw tower on filament freshly drawn from a preform, so the processing removes successive cane portions from the filament as it is drawn. Alternatively, the filament may be drawn from the preform as a continuous length, and be processed into separated portions as a separate stage, outside the draw tower.

In a second step S2, energy is applied to the filament. This may be done in a variety of ways, as described further below. The energy is directed onto the filament at a desired location which divides the filament into a part or portion which is to be separated off to form a cane, and the remaining part or portion of the filament (from which more canes can be separated by repeating the method). In a third step S3, the applied energy is used to introduce a reduction in the width or diameter of the filament at the desired location. As will be understood, the supply of energy to the glass material causes material changes to the glass, which can be handled and directed appropriately to form a narrowed part of the filament. Techniques for achieving this are described further below.

In a fourth step S4, the cane portion of the filament and the remainder portion of the filament, in other words, the portions of the filament on either side of the reduced width desired location, are moved apart. Specifically, the cane portion is moved away from the remainder portion, and in this way the separated cane portion is obtained, separated from the remainder portion at the desired location. The movement of the cane portion can be achieved in various ways.

In one example, the application of energy in step S3 is carried out to reduce the diameter of the filament to a non-zero value, in other words, the filament is thinner at the desired location, but the cane portion is still unitary with the remainder portion. The cane portion is then separated from the remainder portion by introducing a relative longitudinal movement between the two portions, where the longitudinal direction is the direction along the length of the filament (along its longitudinal axis). One or both of the portions may be moved, depending on where the processing is being performed. In a draw tower, for example, both portions may be advancing as the filament is drawn from the preform, and the relative movement is introduced by increasing the advancement of the cane portion at the remote end of the filament. The reduced width and/or the change in the fabric of the glass at the desired location introduces a weakness into the filament; the glass has a reduced structural integrity at this point. Accordingly, moving the two portions apart from one another causes the glass to break, snap, sheer, pull apart or otherwise divide, so that the cane portion becomes separated from the remainder portion of the filament. A similar division may be achieved by relative movement between the portions along a different direction, such as a sideways or bending movement of the cane portion.

In another example, the application of energy in step S3 is carried out to reduce the diameter of the filament to zero, so that the cane portion is non-unitary with the remainder portion but still immediately adjacent thereto. Typically this may be achieved by applying more energy at the desired location, such as energy delivered at a higher power or for a longer time. The energy application alone is hence sufficient to cause complete separation or severance of the cane portion from the remainder portion. The movement in step S4 is therefore a removal of the cane portion from its position adjacent to the remainder portion, so that the cane portion is isolated from the remainder portion and placed in a state suitable for storage or further processing. The movement may or may not be relative longitudinal movement between the two portions, as in the previous example.

Figure 2:
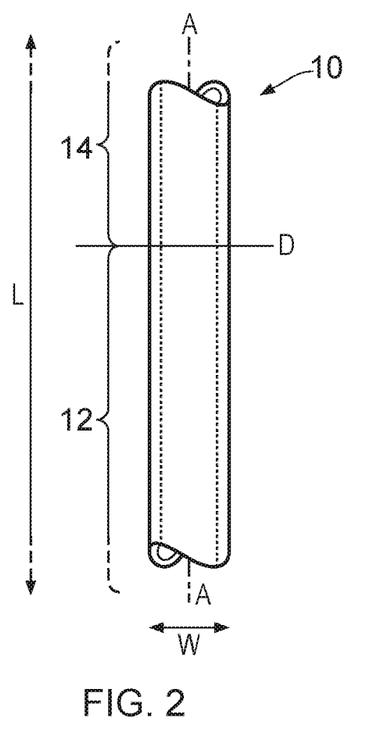
FIG. 2 shows a perspective side view of a glass filament to which methods of the present disclosure may be applied.

FIG. 2 shows a schematic perspective side view of a length of glass filament 10 to which methods of the present disclosure may be applied. The filament 10 has a length L (extending above and below the depicted portion of filament), a longitudinal axis A and a width or diameter W. The filament 10 is nominally divided into a cane portion 12 and a remaining or remainder portion 14 at a desired location D, passing through the filament 10 typically orthogonally to the longitudinal axis A. The remainder portion 14 may or may not extend from a preform or preform assembly (not shown) from which the filament 10 is being drawn. Methods of the present disclosure relate to the separation of the cane portion 12 from the remainder portion 14 at the desired location D, and may be carried out either during or after drawing of the filament 10 from its preform.

The filament 10 has a cross-sectional structure formed from the glass material that corresponds, on a larger scale, to the desired structure of the finished optical fibre. The methods herein are applicable to any fibre structure, and are not limited in this respect.

Figure 3:
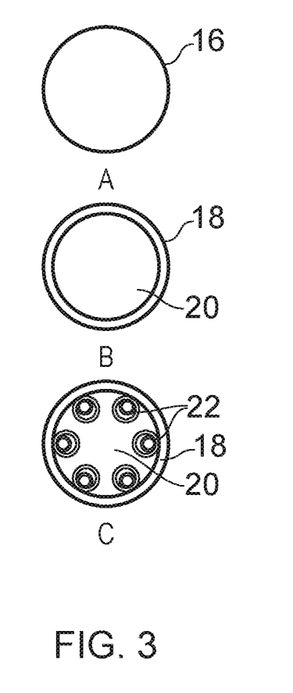
FIGS. 3A, 3B and 3C show transverse cross-sectional views of example filaments such as that of FIG. 2.

FIG. 3 shows some examples of possible cross-sectional structures of the filament 10. FIG. 3A shows a structure for forming an all-solid optical fibre, the filament therefore comprising a solid glass rod 16 in which the core and cladding(s) of the fibre structure are defined by different values of refractive index. FIG. 3B shows a structure for a simple hollow core fibre, the filament comprising a glass tube 18 with a hollow centre 20 that will form the core of the fibre. FIG. 3C shows a structure for a more complex hollow core optical fibre, in which the filament comprises a hollow glass tube 18 that will form an outer cladding of the fibre, or a portion thereof, and a plurality of nested pairs of hollow glass capillaries 22 arranged in a ring around the interior of the tube 18, which will form an inner cladding of the fibre. A hollow space 20 remains inside the ring of capillaries 22, which will form the hollow core of the fibre. This particular design of hollow core fibre can be described as a nested antiresonant nodeless fibre (NANF).

The example structures of FIGS. 3B and 3C therefore comprise one or more lumina, being holes or hollow spaces that extend longitudinally along the filament, and also in the completed fibre formed from a cane cut from the filament. Any other lumen-based structure may also be processed by currently-proposed methods. These include other antiresonant hollow core fibre structures which may include more or fewer nested or un-nested capillaries, spaced or unspaced, in the ring for the inner core, hollow core photonic bandgap (or photonic crystal) fibre structures which comprise an inner cladding defined by a periodic array of lumina or capillaries, and kagome fibre structures which also utilise periodic arrangements of lumina. The disclosure is in no way limited in this regard, and may be applied to glass structures for any optical fibre design.

Figure 4:
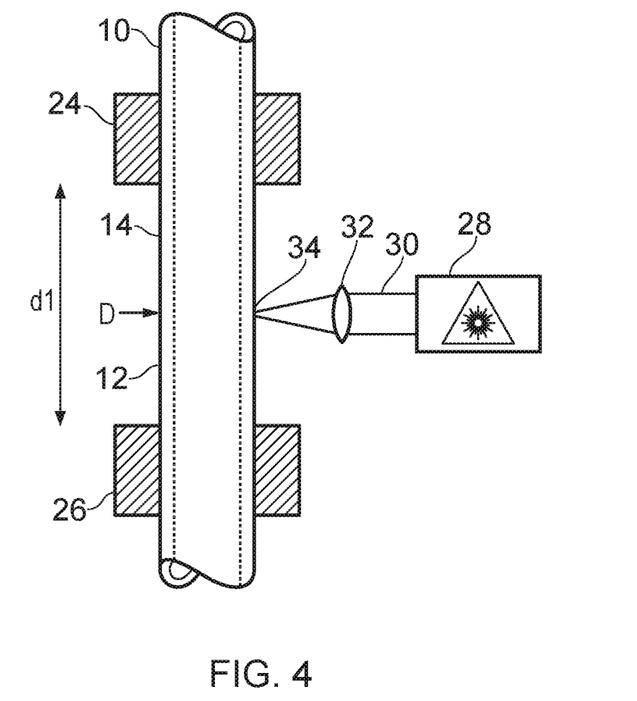
FIG. 4 shows a schematic side view of apparatus for processing a filament according an example of the present disclosure.

FIG. 4 shows a schematic representation of apparatus arranged to carry out an example method of separating a cane from a filament according to the present disclosure. A glass filament 10, shown from the side, which may have any cross-sectional structure as described above with regard to the FIGS. 2 and 3, is positioned for performing the separation. As depicted, the filament 10 is arranged vertically, such as it would be if being drawn in a downwards direction from a preform (not shown) in a draw tower. If not actively being drawn, the filament may be suspended in a draw tower after drawing from the preform, or during a pause in drawing. Alternatively, the filament may be processed after drawing, remotely from the draw tower. In this case, the filament may be vertically oriented as depicted, but may equally be processed in a horizontal position, or an intermediate position, as convenient.

A location on the filament 10, a specified distance from the free (lower) end of the filament (not shown) that corresponds to the required length of a cane, is designated as a desired location D, being a desired longitudinal location or position at which the filament 10 is to be separated into a cane portion and a remaining filament portion. The filament is secured for processing by a first clamp arrangement 24 comprising one or more clamps or clamping devices that hold the filament 10 on one side of (in this example, above) the desired location D. The first clamp arrangement 24 therefore holds the portion of the filament 10 that will become the remaining portion 14 after separation. A second clamp arrangement 26 comprising one or more clamps or clamping devices holds the filament 10 on the other side of (in this example, below) the desired location. The second clamp arrangement 26 therefore holds the portion of the filament 10 that will become the cane portion 12 after separation. At an initial stage, before the application of energy to the filament 10, the clamps are separated by a distance d1.

Energy is applied to the filament from an energy source. The purpose of the application of energy is to deliver energy into the glass material to increase its temperature and cause a change in state that results in a change of shape of the filament. The state change can be softening or ablation, as will be described further below. Accordingly, any form of energy that is able to produce this effect can be used. In the example of FIG. 4, the energy source is a laser 28 which emits a beam of laser light 30. In this simple example, the beam 30 is focussed with one or more lenses 32 in order to form a focal spot 34 which is directed onto the outer surface of the filament 10 in line with the desired location D.

The lenses 32 can be considered to be a beam directing system, which can be configured in a variety of ways depending on the nature of the energy and the energy source, the size of the filament and where the separation method is carried out. In the case of a beam of laser light, the beam may be focussed as in FIG. 4, to form a focal spot at the filament surface that is substantially circular in shape, or substantially linear, or some intermediate or other shape. Alternatively, the beam directing system may substantially collimate the energy towards the filament, where the collimated beam may have a circular, linear, intermediate or other cross-sectional shape. Usefully, the energy can be delivered so as to be distributed around the circumference of the filament 10, rather than to a single point as in depicted in FIG. 4, although this arrangement may be practical if sufficient energy can be delivered in a localised manner. Accordingly, the energy can be applied to one or more regions circumferentially disposed around the filament at the desired location; the regions may be discontinuous spots, or may have the form of a continuous or substantially continuous ring, which may be formed from simultaneous delivery around the circumference, or made up of contiguous or overlapping regions to which the energy is applied.

Figure 5A:
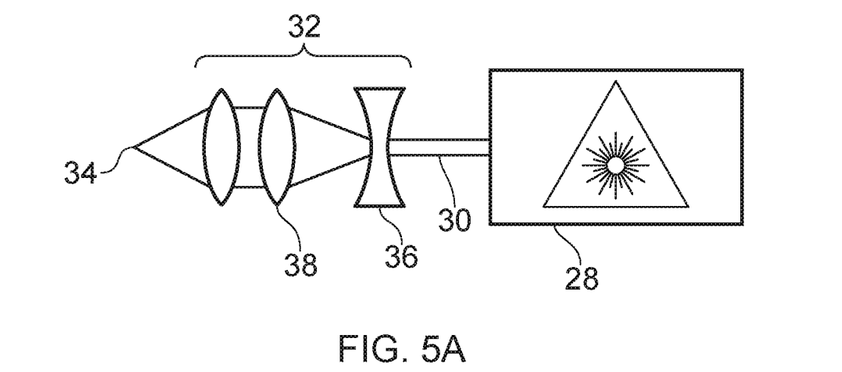
FIG. 5A shows a schematic representation of an example energy source and beam directing system which may be included in the apparatus of FIG. 4.

FIG. 5A shows a simplified schematic representation of an example beam directing system 32 for delivering a laser beam 30 from a laser 28. The beam 30 is emitted from the laser source 28 with a circular beam cross-section, and passes through the beam directing system 32 that comprises a negative cylindrical lens 36 followed by a positive cylindrical lens 38, with their axes parallel. These lenses 36, 38 act to shape the beam into an elongated elliptical cross-section, which is passed through a spherical lens 40 to a focus 34 directed onto the filament.

FIG. 5A shows the resulting elliptical focal spot 34. Usefully, the long axis of an elliptical spot can be arranged to be orthogonal to the longitudinal axis of the filament, so that the spot can extend significantly around the circumference of the filament at the desired location, without reaching far along the length of the filament above and below the desired location. This helps to deliver the energy efficiently to the desired location.

If a laser is used as the energy source, its optical wavelength, output power and operating regime (such as continuous wave or pulsed output) can be selected with reference to the filament properties, such as diameter and glass composition, and the configuration of the beam delivery system, in order to maximise the efficiency of the delivery of an appropriate amount of energy to the filament. As an example, a continuous wave carbon dioxide laser may be used, operating at 10.6 µm or 9.3 µm. Alternatively, the laser output may be in the form of ultrashort pulses, of picosecond or femtosecond duration. Other useful wavelengths are in the green region of the spectrum, such as at or around 532 nm.

The energy source need not be a laser, however. In other examples, the energy source may be a flame source, delivering energy in the form of a flame, such as a hydrogen-oxygen flame. A further alternative is the use of plasma as the energy, delivered for example from an energy source in the form of a plasma torch.

Figure 5B:
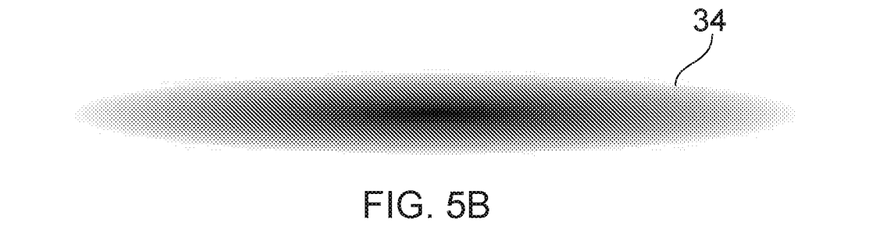
FIG. 5B shows a cross-sectional view of an elongate focussed spot of an energy beam generated by the beam directing system of FIG. 5A.
Figure 6A:
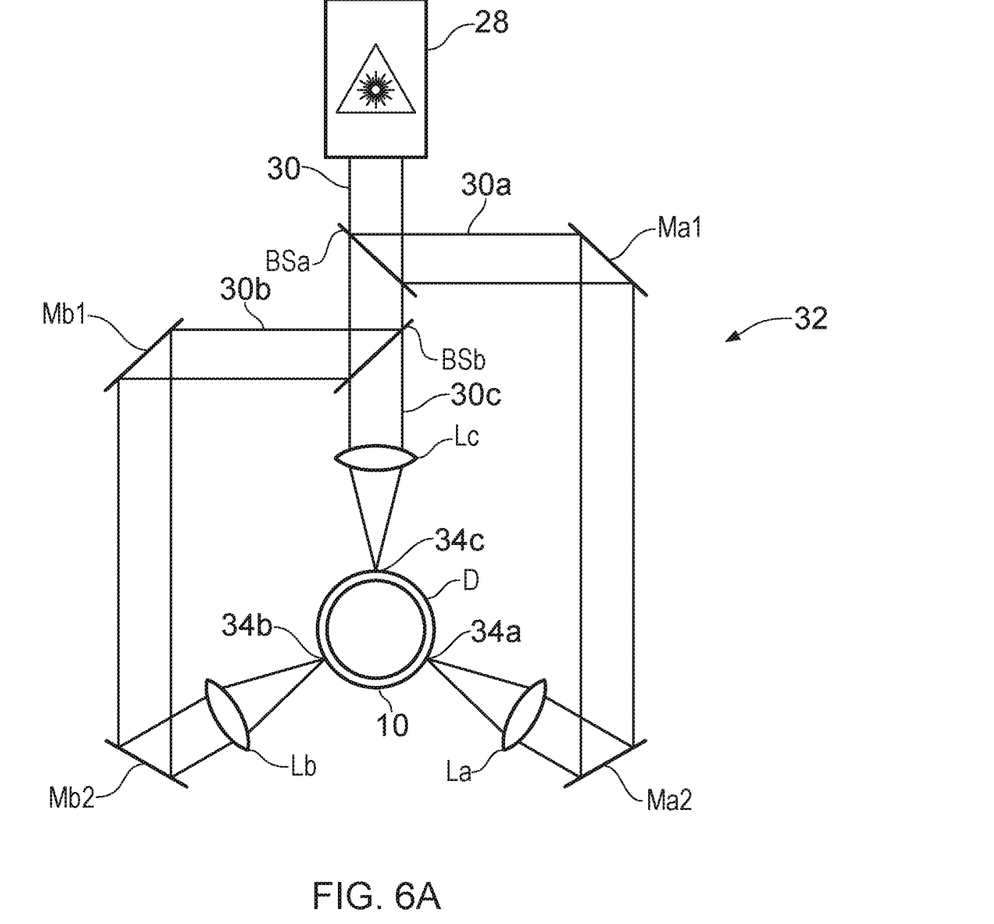
FIGS. 6A, 6B and 6C show schematic representations of further examples of an energy source and beam directing system which may be included in the apparatus of FIG. 4.

FIG. 6A shows a schematic representation, as a view from above/below along the longitudinal axis of a filament, of a further example beam directing system, configured to deliver optical energy in the form of a laser beam simultaneously to three regions circumferentially disposed around the filament. The initial output beam 30 from a laser 28 is incident on a first beam splitter BSa. This divides the light into two parts, one of which, 30a is reflected by the beam splitter BSa and directed by a first pair of mirrors Ma1 and Ma2 to a first region on the filament 10, via a first lens La which focuses the beam 30a to a focal spot 34a at the surface of the filament. A second part of the original beam 30 is transmitted by the first beam splitter BSa to a second beam splitter BSb, which divides the light into two parts. One part 30b is reflected by a second beam splitter BSb to a second pair of mirrors Mb1 and Mb2 which direct the beam part 30b to a second region on the filament 10, via a second lens Lb which focuses the beam 30b to a focal spot 34b on the surface of the filament 10. Finally, a remainder part of the light 30c is transmitted by the second beam splitter BSb towards a third region on the filament 10, via a third lens Lc which focuses the beam 30c to a focal spot 34c on the surface of the filament 10. The three regions 34a, 34b, 34c are evenly spaced apart around the circumference of the filament 10, at the desired location D. Hence, a greater proportion of the circumference is exposed to the laser beam energy than would be possible with a single beam. The exposure can be enhanced if the lenses La, Lb, Lc are configured to shape the beams into elongate focal spots as in the example of FIG. 5B; multiple elongate spots can be arranged to wrap around most or all of the circumference and therefore expose the filament all around the desired location. If the specification of the beam splitters is chosen appropriately, each beam part can comprise the same amount of laser energy in order to deliver a more even distribution of energy to the filament, but this is not essential.

In other examples the laser beam may be divided into more or fewer parts, by providing more or fewer beam splitters and lenses. Each part can be directed onto a different circumferentially-spaced region on the filament; if the spacing is even and each beam part has roughly the same energy an even distribution of energy is delivered around the desired location. The lenses and plane mirrors of the FIG. 6A example may be replaced with non-plane mirrors, for example paraboloidal mirrors. Also, separate lasers may be used to deliver each beam part directly, so that beam splitters to divide the beam are not needed.

Depending on factors including the focal spot size, the amount of energy in the beam parts, and the size and structure of the filament, delivering the energy statically to one or more regions around the circumference of the filament may be suitable for achieving the required provision of energy to the glass. In other cases, it may be more suitable to ensure that more regions, or the full circumference, receive energy. To achieve this, an entire beam delivery system such as that shown in FIG. 6A can be configured to be rotatable around an axis coincident with the longitudinal axis of the filament, to as to trace the focal spot or spots of the beam or beam parts fully or partly around the filament. A continuous circumferential region of energy exposure might be provided in this way, or an circumferential arrangement of spaced-apart regions if the energy is not delivered continuously. Alternatively, the various groups of mirrors and lenses may be moved in order to direct their corresponding beam parts to different regions at the desired location, for example in a scanning arrangement.

Figure 6B:
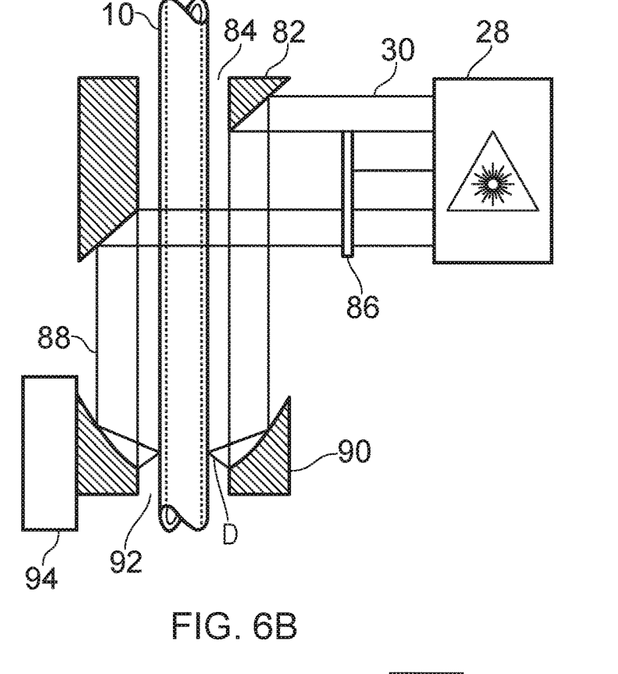

FIG. 6B shows a schematic representation, as a side view, of another example beam directing system, configured to deliver optical energy in the form of a laser beam over a substantially continuous ring around the filament. A plane mirror 82 is arranged to direct the output beam 30 from a laser 28 substantially coaxially with the filament 10 to form a reflected beam 88. The output beam 30 is configured to have a diameter greater than the width of the filament 10 in order that a substantial portion may pass the filament 10 to reach the plane mirror 82. The plane mirror 82 is provided with a hole 84 or other means of allowing the filament 10 to pass through it. An optional baffle 86 may be included to block the part of the output beam 30 that would otherwise be incident on the filament 10, allowing the rest of the output beam to propagate past the baffle 86 to reach the plane mirror 82. The reflected beam 86, which has the form of a cylinder substantially surrounding the filament 10, propagates along the length direction of the filament to be incident on a paraboloidal mirror 90. As with the plane mirror 82, the paraboloidal mirror 90 is provided with a hole 92 or other means of allowing the filament 10 to pass through it. The paraboloidal mirror 90 is configured to focus the reflected beam 88 to a ring around the filament 10, focussed at or near the filament's outer surface at the desired location D. The ring focus may not be continuous around the filament, for example owing to an area in the reflected beam 88 being shadowed by the filament 10 or the baffle 86, full circumferential exposure of the filament to the laser energy at the desired location D may be achieved by relative rotational movement of the beam directing system and the filament.

Figure 6C:
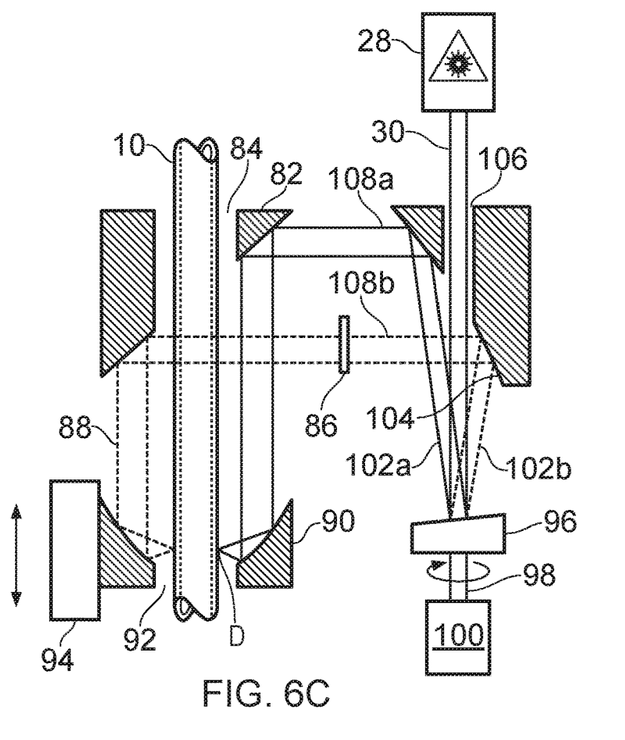

If a beam directing system such as the examples of FIGS. 6B and 6C is employed while the filament is being drawn from a preform assembly in a draw tower, it is useful to have the paraboloidal mirror 90 mounted on a carriage 94 arranged for movement parallel to the draw direction and the filament's longitudinal axis FIG. 6C shows a schematic representation, as a side view, of a yet further example beam directing system, in this case configured to deliver optical energy in the form of a laser beam swept around a substantially continuous ring around the filament, at the desired location D. The system comprises a plane mirror 84 and a facing paraboloidal mirror 90 arranged annularly around the filament 10 as in the FIG. 6B example. Prior to the plane mirror 84, the system is differently configured, however. The output beam 30 from a laser 28 is directed along a propagation direction substantially parallel to but offset from the longitudinal axis of the filament 10, to a plane scanning mirror 96. The beam waist of the output beam 30 may be positioned coincident with the surface of the scanning mirror 96. The scanning mirror 96 is mounted on a shaft 98 driven by a motor 100 for rotational movement centred on the point of incidence of the output beam 30 on the scanning mirror 96. However, the scanning mirror 96 is mounted such that there is an angle between the axis of the shaft 98 (axis of rotation) and the normal to the surface of the mirror 96. Thus, as the shaft 98 and scanning mirror 96 rotate, the propagation direction given to the beam 102 reflected from the scanning mirror changes according to the rotational position of the shaft 98. This changing propagation direction is indicated in FIG. 6C by the reflected beam 102a at a first position, and the reflected beam 102b in phantom at a second position. The reflected beam 102 therefore travels over the surface of a cone, as the scanning mirror 96 rotates. Alternative ways to scan the reflected beam in a similar manner include the use of a prism and a prism pair (Risley prisms). The reflected beam 102 is incident on an off-axis paraboloidal mirror 104, which may if necessary have a hole 106 or other means of allowing the output beam 30 from the laser 28 to pass through it. The paraboloidal mirror 104 is arranged such that the doubly reflected beam 108 leaving its surface has a propagation direction independent of the position of the shaft 98, in order to always propagate along a same parallel direction to the plane mirror 82, which directs the beam 88 to the focussing paraboloidal mirror 90 to focus the beam to the desired location D, as before. The changing propagation direction of the reflected beam 102 leaving the scanning mirror 96 causes the focus of the beam at the filament surface to sweep around the circumference of the filament. In this way, the energy can be exposed onto the filament along a continuous ring around the filament, without the need to rotate either the beam directing system or the filament.

As noted the energy need not be optical energy in the form of a laser beam. Similar delivery arrangements that allow simultaneous exposure of multiple regions around the filament can be provided for other energy types. For example, if the energy is derived from a flame, several flame sources can positioned around the filament, optionally in a rotatable arrangement. If the energy is a plasma delivered as a plasma jet from a plasma torch, several plasma torches can be positioned around the filament, again optionally in a rotatable arrangement.

Figure 7:
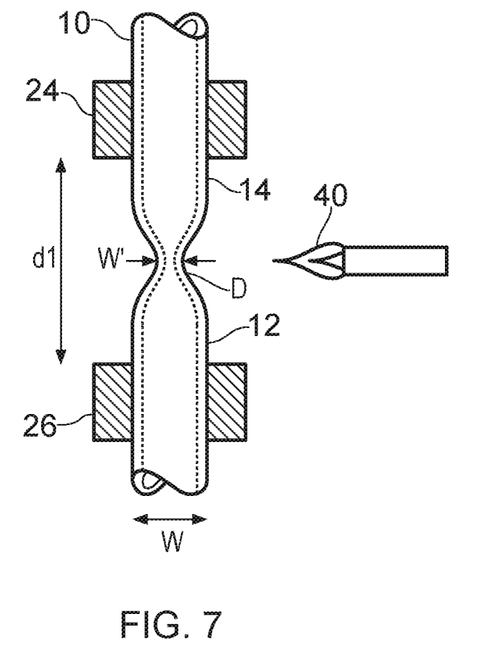
FIG. 7 shows a schematic side view of alternative apparatus for processing a filament according to an example, at an intermediate point of a processing method performed on a glass filament.

FIG. 7 shows a schematic side view of example apparatus similar to that shown in FIG. 4, but after energy has begun to be or has been applied to the filament 10. In this example, the energy source is a flame 40, delivered to one (as shown) or multiple regions around the filament 10 at the desired location D. In this example, the amount of energy which is delivered is selected with reference to the properties and characteristics of the filament 10 in order to cause a softening or partial melting of the glass material of the filament at the desired location. The softening enables deformation of the filament 10 such that its width W is reduced at the desired location, to form a neck, waist or "necked down" part or region having a smaller, non-zero, width W'. The deformation can be enabled by any of various means. If the filament has a cross-sectional structure including one or more lumina, the softening can cause distortion of the internal structure and collapse of the lumen, so that the outer wall of the filament also collapses inwards and reduces the width.

Figure 8:
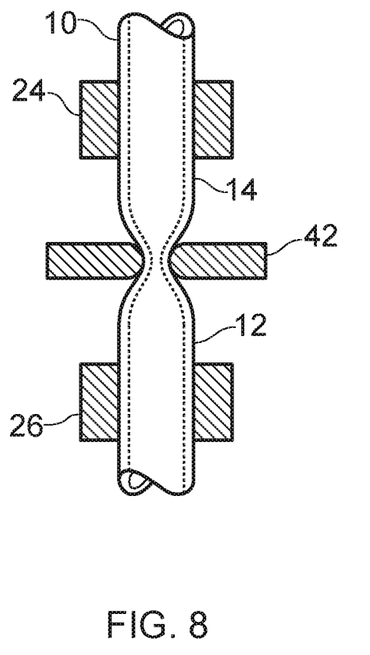
FIG. 8 shows a schematic side view of the apparatus of FIG. 7 or FIG. 4, at a further intermediate point in a processing method that includes the use of crimping jaws.

FIG. 8 shows a schematic side view of an example apparatus for enabling the reduction in width. After the glass has softened (and conveniently but not necessarily after the energy delivery is complete), crimping jaws 42 or a similar device can be applied to the filament at the desired location and operated to apply an inward pressure in the plane of the desired location (a pinching or compressing action) in order to reshape the glass into a narrower form and create the neck. This is applicable for both solid and hollow or partly hollow filaments.

Otherwise, some relative movement can be made between the cane portion 12 and the remaining portion 14 to produce or enhance the narrowing of the width. The movement might be longitudinal, along the axis of the filament, so that the softened glass is stretched over a large length and therefore will adopt a smaller width, or might be rotation to produce a twisting action that will deform and compress the softened glass.

Once the narrowed neck portion has been created, and while the glass is still in a softened state (hence energy may continue to be applied to maintain the increased temperature), the cane portion 12 is separated from the remainder portion 14 of the filament 10.

Figure 9:
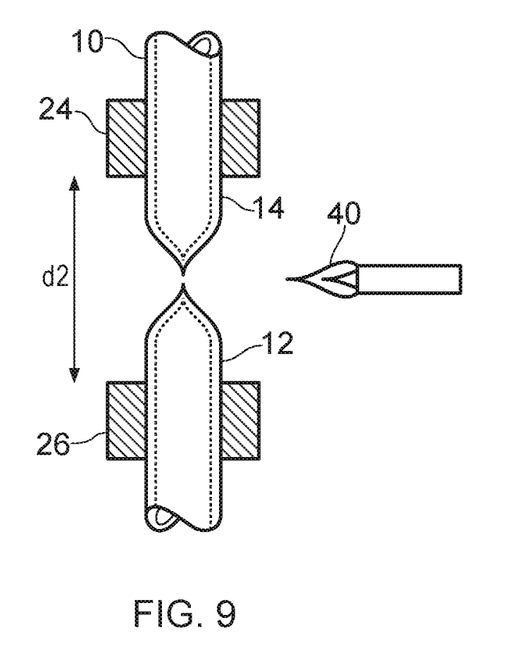
FIG. 9 shows a schematic side view of the apparatus of FIG. 7, at an end point of the processing method showing a cane portion separated from the filament.

FIG. 9 shows the example apparatus of FIG. 7 after separation has been effected. To produce the separation, the cane portion 12 and the remainder portion 14 are moved apart from one another in the longitudinal direction. The movement is relative, in that one or both portions may be moved. Within the present example, the movement can be effected by increasing the distance between the first clamp arrangement 24 and the second clamp arrangement 26, from the spacing d1 of FIGS. 4 and 7 to a larger spacing d2. The softened glass material will stretch and neck down to increasingly narrow widths until the material of the two portions 12, 14 pulls apart and the portions separate, as shown in FIG. 9.

Alternatively, the amount of energy applied to soften the glass, optionally aided by crimping jaws or the like, may be enough of itself to produce the separation, by reducing the filament down a necked region with a zero width. The movement between the portions can then be performed to move the already-separated cane portion away from the remainder portion and to a different location.

If the softened glass approach is used, the glass of the outer surface of the filament moves inwardly and eventually closes over the end of each of the portions 12, 14 leaving a teardrop or ogive shape at the portion ends. In general, this is beneficial in that the end surface flaws that can be introduced by mechanical cane separating techniques are eliminated. In the specific case of a filament with one or more lumina in its interior structure, the closed shaping of the glass at the end of the cane portion and the end of the remainder portion acts to close or seal the lumina. This prevents the ingress of contaminants into the lumina, both during the separation process and during later stages such as storage and further processing. The quality of optical fibre subsequently drawn from canes produced in this way is therefore potentially improved over that from mechanically-separated canes.

The amount by which the spacing or separation d1 has to be increased to d2 in order to cause separation will depend on the diameter of the filament and the size of the reduced width W'; a thicker filament may require a greater relative longitudinal movement to cause the width to neck down to zero, at which point separation occurs.

Once separated from the filament, the cane portion or cane can be moved to a different location for storage or further processing, such as by a manipulator or robotic arm, in line with known cane and fibre drawing procedures. The second clamp arrangement 26 may be used for this purpose.

As an alternative, one or other of the first clamp arrangement and the second clamp arrangement may be omitted, and the filament secured for processing by a single clamp arrangement only. In such a configuration, if the filament is secured in a vertical orientation as in the Figures, and as it would be in a draw tower, gravity can be used to effect the movement between the cane portion and the remainder portion of the filament. Once the glass at the desired location has been softened, the cane portion will drop under its own weight by the action of gravity, perhaps assisted by the weight of the second clamp arrangement if this is the one clamp arrangement used, until the neck portion thins to zero width and the cane becomes separated. Rapid application of sufficient energy may create a zero-width neck portion before the cane portion starts to drop, so that the gravitational motion moves the already-separated portions apart.

Figure 10:
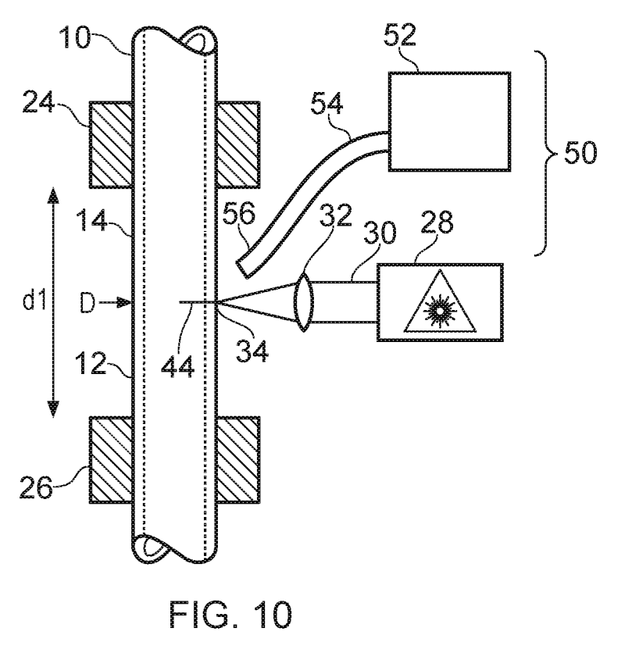
FIG. 10 shows a schematic side view of further alternative apparatus for processing a filament according to a further example method, at an intermediate point in the method.

FIG. 10 shows a simplified schematic view of apparatus for performing a method of cane separation according to a further example. As with the method described with respect to FIG. 4, initially a filament 10 is secured vertically, such as inside a draw tower, by a first clamping arrangement 24 at an upper position and by a second clamping arrangement 26 at a lower position, on either side of a desired location D which divides the filament 10 into a remainder filament portion 14 and a cane portion 12 which is to be separated from the remainder filament portion 14. The first and second clamping arrangements are separated by a spacing d1, as before.

Again as previously, the apparatus includes an energy source in the form of a laser 28 which emits a beam of laser light 30 which is focussed and directed onto the filament surface at the desired location D by a lens arrangement 32 which forms a focussed spot 34. As before, the laser energy source can be configured with an appropriate beam directing system to apply one, two or more focussed or collimated spots of light around the circumference of the filament 10, with the option of rotating around the filament in order to deliver light to any or all circumferential regions. Similarly, the energy source may alternatively comprise one or more flame sources or plasma sources.

This example differs from previous examples in that the energy is primarily delivered in such a way as to ablate the glass material of the filament at the desired location, rather than to soften the glass material. For softening, the state change of the glass material is melting, moving from a solid glass to a softened, near-liquid glass due to an appropriate temperature increase caused by the deposited energy. In contrast, ablation causes a state change of the glass material from solid to gas or plasma, depending on the density of the delivered energy. At lower densities or fluxes the solid glass is converted to a gas by evaporation or sublimation, whereas a higher density can convert the solid material directly to a plasma. Accordingly, ablation causes the physical removal of material from the filament. The removal can be limited to the outer or surface layer or layers of the filament, and in this way, the width of the filament is reduced at the desired location, in line with, but via a different mechanism from, the width reduction by necking down achieved in the glass softening example. Alternatively, the ablation may remove enough material to effectively cut through the filament, reducing the width to zero at that point.

The skilled person will be able to select appropriate operating parameters for the energy source in order to deliver the energy to the filament in a way that will produce ablation rather than softening. In general, a higher energy density will be required to achieve ablation than to produce softening.

The ablation is carried out by removing material so as to create a cut, groove or slot 44 in the filament, by directing energy to the desired location. The slot 44 is preferably circumferential in orientation, in that it is aligned around the circumference of the filament, substantially perpendicular to the longitudinal axis of the filament. By relative rotational movement of the applied spot or spots of the energy beams, such as the laser beam 30 of the FIG. 10 example, around the filament (as previously described), one or more slots 44 can be created at the desired position. The slot 44 may be cut as a continuous slot around the filament, for example by sweeping a single beam right around the filament, or as a series of overlapping or adjacent slots each cut by a different one of multiple beams spaced apart around the filament.

A reduction in filament width to a non-zero width caused by the presence of the slot or slots 44 weakens the filament at the desired location. Accordingly, the filament can be broken at the desired location by causing a relative longitudinal movement between the cane portion 12 and the remainder portion 14 so as to move the two portions apart.

Figure 11:
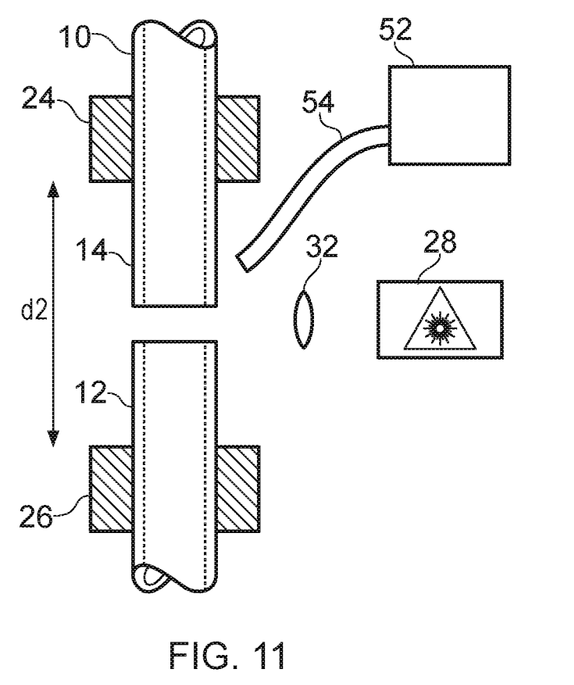
FIG. 11 shows a schematic side view of the apparatus of FIG. 10, at an end point of the processing method showing a cane portion separated from the filament.

FIG. 11 shows the apparatus of FIG. 10 with the cane 12 separated from the remaining portion 14 of the filament, following a relative longitudinal movement of the two portions corresponding to an increase in the spacing of the clamping arrangement spacing from d1 to d2 This may be carried out after the application of energy to cause the ablation, so the energy source (laser) 28 is shown in a non-operational condition, with no output beam. The strain caused by the longitudinal movement causes the filament to preferentially snap at the weakened point of the desired location, allowing the cane 12 to separate from the remaining portion of the filament 10. The slot (s) 44 may be cut to any depth, with a slot depth which is a greater proportion of the filament width increasing the weakness at the desired location and hence facilitating separation of the cane 12. A convenient depth for hollow core filament is approximately the wall thickness of the outer glass tube. Alternatively, the slot or slots may be sufficiently deep to form a reduced width of zero and completely sever the cane 12 from the filament.

As discussed with regard to FIG. 9, one clamping arrangement only may be used to secure the filament in a vertical orientation, and the force of gravity used to effect the relative longitudinal movement to separate the cane.

The use of energy, delivered as laser light or a flame or plasma, to cause ablation allows the slot to be cut without any generation of solid debris such as chips of the glass filament material which may be created when mechanical cleaving techniques are used which rely on saws, abrasive wheels, or diamond, ceramic or steel blades.

In contrast with the glass softening embodiment, which allows the end of the cane to be closed thereby sealing any lumen, the ablation approach allows cane separation to be achieved with minimal distortion of the internal structure of the filament, so that lumina can be maintained open and the end parts of a cane are able to be drawn into optical fibre. Maintaining some or all of the lumina open is relevant for fibre drawing methods in which one or more internal pressures are controlled. This reduces waste and allows fibre output to be maximised. The parameters of the applied energy can be selected with reference to the internal filament structure in order to minimise distortion of the interior walls and closure of the lumen. In other words, the energy application may be formulated in order to maximise the ablation effect and minimise melting or softening of the glass.

As mentioned, ablation by the application of a laser beam or other form of energy is a process that typically produces vapour or plasma. Any vapour may subsequently condense. In the present case, the condensation may be on the outer surface of the filament, on the end surface as exposed by the cut slot, and if there are lumina, on inner surfaces of the filament. This condensation is effectively a contamination, in that material (albeit glass material from the filament itself) is deposited where it should not be present. This can affect the drawing of the separated cane into a fibre, and modify the fibre's optical properties such as giving an increased optical propagation loss. Accordingly, it is proposed that the by-products of ablation be removed as they are generated, in order to reduce condensation and maintain the filament quality.

Returning to FIGS. 10 and 11, the apparatus additionally comprises a vapour handling system 50, shown in simplified form, which comprises an air handling unit 52 and ducting 54 connected to the air handling unit at one end. The other, remote, end (or ends) 56 of the ducting 54 is placed adjacent to the filament 10, proximate the desired location D and the region of the filament 10 to which the energy spot 34 is applied.

Figure 12:
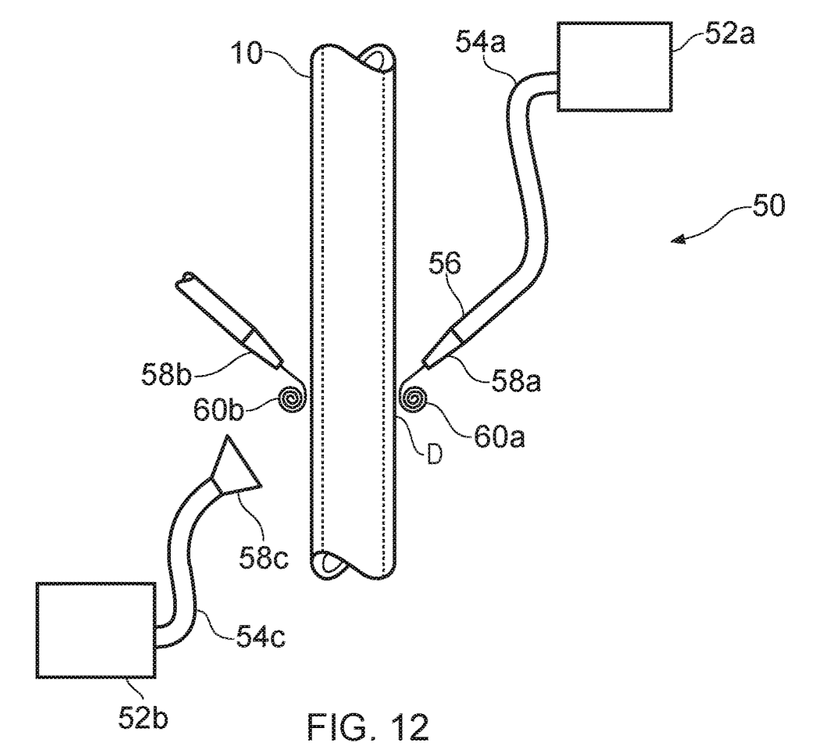
FIG. 12 shows a schematic side view of an example vapour handling system suitable for inclusion in the apparatus of FIGS. 10 and 11.

FIG. 12 shows a schematic simplified view of an example air handling unit, in more detail. The vapour handling unit 50 includes a first air handling unit 52a with an associated first duct or ducts 54a. The first air handling unit 52a delivers clean, dry air (or an alternative gas such as nitrogen) through the first duct 54a, which is an emission duct to one or more nozzles 58a, 58b at the remote end 56 of the first duct 54a. In the case of two or more nozzles, these may be arranged around the circumference of the filament 10, proximate the desired location D and slightly spaced apart from the filament surface. Alternatively, the nozzles 58a, 58b may be in the form of a slot or slots arranged circumferentially about the axis of the filament 10. The nozzles 58a, 58b emit the air delivered from the first air handling unit 52a as air flow 60a, 60b from each respective nozzle; the air flow 60a, 60b is arranged to impinge on the filament 10 in such a manner as to entrain vapour and/or particles generated by the impact of the energy (not shown) which applied to the filament 10 at the desired location D. The air flows 60a, 60b carry the entrained vapour and particles (which we may commonly term debris or by-products of the ablation) so as to move them away from filament 10. For example, the flowing air may hit the filament surface and bounce off it in an outward direction, carrying the debris with it. In this way, the debris is taken out of the vicinity of the filament 10, and the risk of the debris depositing onto the outer and/or inner surfaces of the filament 10 is reduced. To enhance the effectiveness of this removal, the air handling capability of the vapour handling unit 50 may be supplemented by a second air handling unit 52b equipped with an extraction duct 54c. the second air handling unit 52b is an air intake unit rather than an air emission unit. The remote end 56 of the extraction duct 54c has a nozzle 58c positioned appropriately to collect the flowing air 60a, 60b that has entrained the vapour and particles. More than one extraction duct 54c may be provided, or the extraction duct 54c may have more than one end nozzle 58c.

Returning to FIG. 10, note that the ablating energy, such as the laser beam 30, is delivered onto the filament surface along a direction which is substantially orthogonal to the longitudinal axis of the filament (horizontal in the depicted orientation of a vertical filament). In the event that the filament 10 is has an internal cross-sectional structure comprising a lumen, such as the example of FIG. 3c, it will be apparent that the outer tube 18 will be cut through before the walls of the inner capillaries 22. If the energy is in a beam 30 brought to a focal spot 34 at the desired location D, the energy beam 30 will diverge after the focal spot 34 before passing through the filament 10. The diverged beam will be incident on the inner structure of the filament including the opposite inner surface of the outer tube 18. For a horizontally directed beam, the divergent energy will spread both above and below the desired location, and hence be incident on both the cane portion 12 and the remaining filament portion 14. This may generate vapour which will be inaccessible to the vapour handling system 50, and which can hence subsequently condense inside the both the cane portion 12 and the remaining filament portion 14. Hence, both portions of the filament 10 may be internally contaminated.

Figure 13:
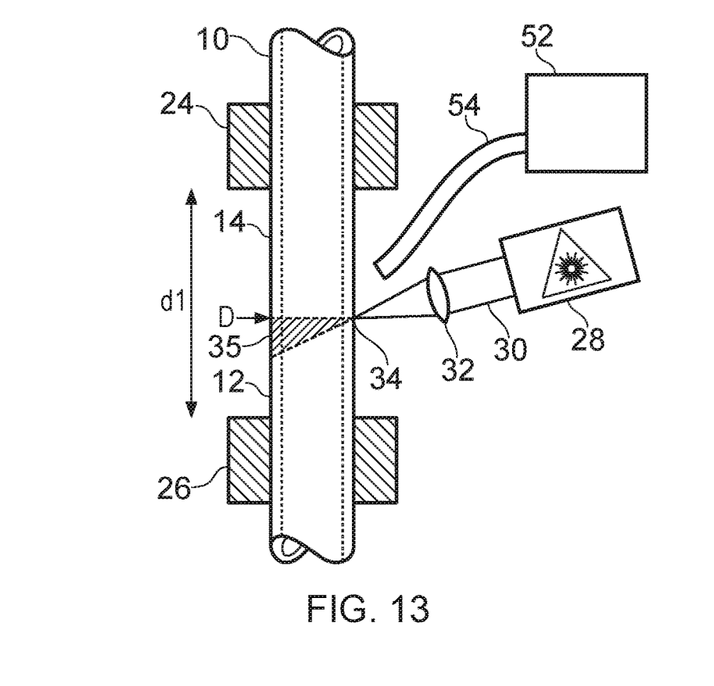
FIG. 13 shows a schematic side view of a modified version of the apparatus of FIG. 10.

FIG. 13 shows a simplified schematic side view of apparatus modified to address this circumstance. The beam directing system (comprising lens 32 in the depicted simple arrangement, but which may be considerably more complex and configured to handle multiple beams or have multiple beam directions as described with regard to FIG. 6A, 6B or 6C) is arranged such that the energy beam or beams 30 are directed in a downwardly sloping direction (relevant to the depicted vertical orientation of the filament 10). This allows the focal spot 34 to be incident on the exterior of the filament 10 at the desired location D to effect separation of the cane portion 12 at the correct portion, while the diverging beam after the focal spot 34 is incident on the interior structure of the filament 10 over a region or regions 35 (shaded in FIG. 13) which are substantially or entirely within the cane portion 12, that is, below the desired location D. In this way, the condensation of any vapour will be confined substantially within the cane portion 12.

While the examples thus far have been described largely within the context of separating a cane from a larger length of glass filament, either while the filament is being drawn from a preform in a draw tower, or after drawing, the separation methods are not limited in this regard. In particular, any of the examples and modifications thereof may be used to cut an existing cane to a different length by removing a portion at one or both ends of the cane. This might be to achieve a particular length of cane for example. In the case that the softened glass separation method has been used to acquire a cane from a drawn filament, so that the cane has a closed or necked-down end, the ablation separation method may be used to remove the end parts, for example. In such a case, the angled beam application described with respect to FIG. 13 may be used to limit internal vapour condensation to the end part which is being removed, thereby avoiding contamination of lumina in the finished cane. Accordingly, references in the preceding description to "filament" can apply to filament that has been or is being drawn from a preform and which require cutting into canes or other shorter lengths, and also to an already separated cane from which a part or parts are to be separated. References to "cane portion" can refer to a cane being separated from a filament, or to any part being separated from a cane, such as a necked or closed end part. References to "remaining portion of the filament" (and similar terms) can apply to filament remaining after separation of a cane, or to the bulk of a cane remaining after the separation of one or both end parts. The methods may also be used for cutting finished optical fibre to desired lengths or trimming off end parts.

The use of a single clamping arrangement (or similar securing or holding device) and the force of gravity to cause the separation by relative longitudinal motion, as already described, may be useful and convenient in the context of removing portions from existing canes.

When a method according to the examples described herein is employed while the filament is being drawn from a preform assembly in a draw tower, apparatus for enabling the method can include a system or device for pulling the filament downwardly from the preform to achieve a continuous draw, as is well understood.

Figure 14:
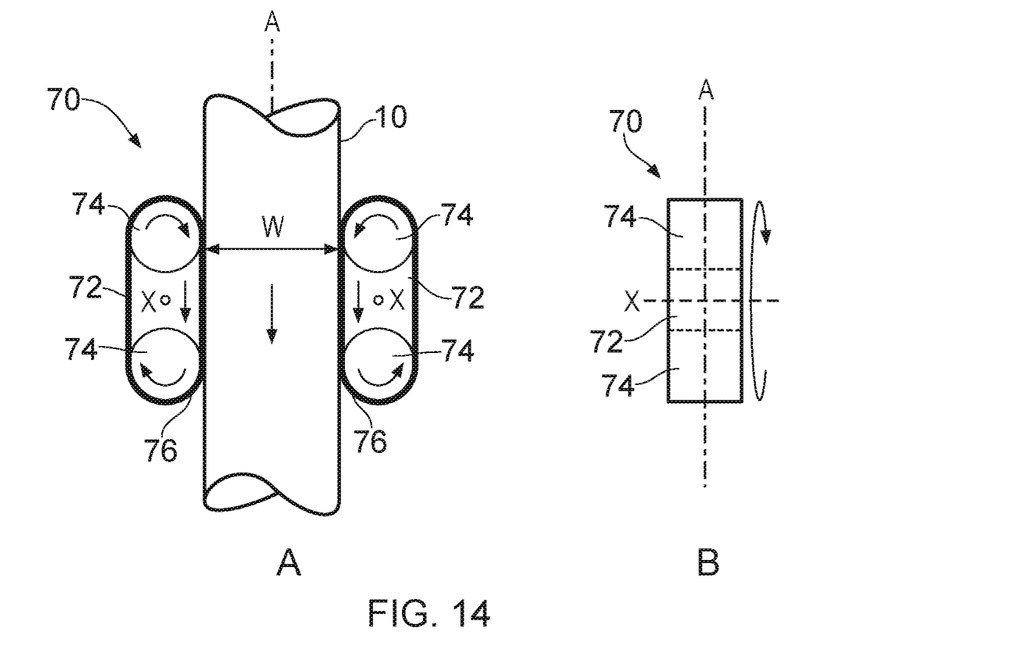
FIGS. 14A and 14B show orthogonal side views of a cane puller by which glass filament can be pulled or drawn from a glass preform.

FIGS. 14A and 14B show simplified schematic views of an example device for this purpose, commonly termed a "cane puller". The device 70 comprises a pair of rotatable belts 72, each of which has the form of a continuous loop that passes around a pair of spaced apart drive wheels 74 that hold the belt in a taught configuration. Rotation of the two drive wheels in the pair in the same direction pulls the belt around and around in the same direction. The axis X about which this rotation occurs lies midway between the axes of the two drive wheels. The two belts 72 are arranged in an opposing configuration with their axes of rotation X parallel so that the outwardly facing surfaces 76 of the belts 72, which each provide a moving surface when the belt 72 rotates, face one another to provide opposing parallel moving surfaces 76. The opposing moving surfaces 76 are spaced apart by a width W (conveniently the relative position of the belts 72 can be adjusted to move the belts into and out of this alignment) corresponding to the width of the filament 10. Accordingly, the filament 10 can be gripped between the two opposing surfaces 76 of the belts 72, oriented with its longitudinal axis A orthogonal to the rotation axes X of the belts 72, and parallel to the direction of movement of the moving surfaces 76. If the drive wheels 74 of one belt 72 are driven in the opposite direction to the drive wheels 74 of the other belt 72, the two moving surfaces 76 will move in the same direction, as indicated by the arrows. Accordingly, the filament 10 will be continuously fed through the space between the moving surfaces 76, in that same direction (downwardly in the depicted orientation). This will continuously pull fresh filament 10 from a preform (not shown), thereby providing a continuous supply of new filament 10 from which canes can be separated.

The drive wheels 74 are under control of a drive mechanism (not shown) that may include a computerised controller programmed to provide automated control of the pulling of the filament 10.

FIG. 14A shows a side view of the cane puller 70, in a plane transverse to the rotation axes X of the belts 72. FIG. 14B shows the orthogonal side view of the cane puller 70 (without any filament), in a plane parallel to the rotation axes X of the belts 72. From this it can be appreciated that the two belts 72 have the same alignment (since one is concealed behind this other from this viewing angle), in that their axes of rotation X are parallel to one another and orthogonal to the filament axis A, providing moving surfaces that move in a direction also parallel to the filament axis.

Figure 15:
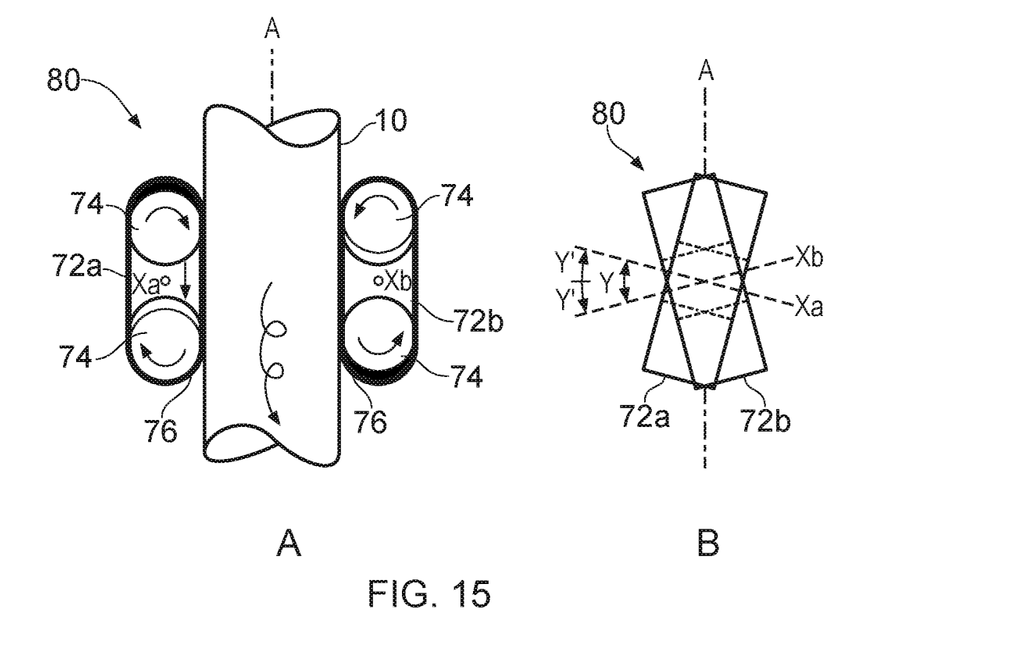
FIGS. 15A and 15B show orthogonal side views of an example cane puller according to an aspect of the present disclosure.

FIGS. 15A and 15B show simplified schematic side views of an example cane puller according to an aspect of the present disclosure. The cane puller 80 comprises a pair of opposing rotatable belts 72a, 72b configured and operable in the manner described with regard to FIGS. 14A and 14B to provide a pair of opposing movable surfaces 76 spaced by a distance W that act to grip and continuously feed a filament 10 in a downward direction, by the belts 72a, 72b being driven in opposite directions. However, in this example, the axes of rotation Xa, Xb of the belts 72a, 72b are not parallel to one another. Instead they lie in parallel planes which are also parallel to the axis A of the filament, but each is positioned at a substantially equal but opposite non-orthogonal angle to the axis A of the filament (and hence also to the direction of travel or feed of the filament through the cane puller). This can be appreciated from FIG. 15B, which shows that each belt 72a, 72b is tilted away from the vertical direction (filament axis A) within the plane of the moving surfaces 76, but in opposite directions. Hence, there is an angle Y between the two axes of rotation Xa, Xb. The axis of rotation Xa of one belt 72a lies at an angle Y' above the horizontal direction (orthogonal to the filament axis A) while the axis of rotation Xb of the other belt 72b lies at the same angle Y' below the horizontal direction, where 2Y'=Y. Similarly, the two axes of rotation lie at equal and opposite non-orthogonal angles, 90°−Y', to the filament axis A, which is also the longitudinal direction along which the filament is pulled or drawn from the preform. This may also be described as the directions of travel of the moving surfaces 76 of the two belts 72a, 72b being separated by the angle Y, each lying at an angle Y' on either side of the filament axis A.

The effect of this angled positioning of the two rotating belts is to impart a twisting motion to the filament 10 as it is fed downwards through the cane puller 80, indicated by the spiral arrow R in FIG. 15A. The filament 10 therefore rotates about its longitudinal axis A as it is pulled through the cane puller 80. This motion can be used to provide the relative rotational movement between the applied energy beam(s) and the filament in order to deliver to energy circumferentially around the filament at the desired position, as described above. Accordingly, a beam directing system 32 such as those shown in FIGS. 4, 5A, 6A, 6B and 6C may remain stationary while the filament rotates about its axis A. Alternatively, the two motions may be combined, with the beam directing system 32 rotating about the filament in a first direction, and the filament rotating within the beam directing system, in a second opposite direction.

The cane puller 80 may be configured such that the angles of the belts are fixed, so that a constant twisting motion is provided during filament draw. Alternatively, the belts may be movable (for example under control of a same controller as operates the rotation of the rotating belts) so that their relative angles may be adjusted. This can allow the filament rotation to be turned on and off (by switching the belt rotation axis angles between non-orthogonal and orthogonal to the filament axis), or turned between rotation in one direction and rotation in the opposite direction (by reversing the non-orthogonal belt rotation axis angles), or changed in speed (by making the non-orthogonal belt-rotation axis angles smaller or larger).

Other methods for producing rotation of the filament within the energy beam directing system may be alternatively be used.

The filament processing methods proposed herein are applicable generally to filaments comprised of glass materials. The filament may be made from materials known for the fabrication of existing designs of solid and lumen-containing optical fibres, in particular glass materials such as silica. For internally structured filaments, the various tubes and capillaries may be made from the same material or from different materials. Types of glass include "silicate glasses" or "silica-based glasses", based on the chemical compound silica (silicon dioxide, or quartz), of which there are many examples. Other glasses suitable for optical applications and from which the filament may usefully be made include, but are not limited to, chalcogenide, tellurite glasses, fluoride glasses, and doped silica glasses. The glass materials may include one or more dopants for the purpose of tailoring the optical properties, such as modifying absorption/transmission or enabling optical pumping.

The methods are also generally applicable to a wide range of filaments widths or diameters, such as from typical optical fibre diameters, for example about 100 μm, up to typically cane diameters of 20 mm or more.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

The invention claimed is:

1. A method of processing glass filament, comprising:
   providing a length of glass filament from which a portion is to be separated from the remainder of the filament, the filament having an internal structure comprising one or more longitudinal lumina;
   directing energy, in the form of one or more laser beams, plasma beams, or flames, onto the filament in order to cause a decrease in a width of the filament at a desired location for separation of the portion that is sufficient to cause ablation of the glass of the filament at the desired location, wherein the energy is directed at a non-orthogonal angle to the longitudinal axis of the filament and towards the portion so as to reduce condensation of vapour generated by the ablation inside the lumina in the remainder of the filament; and
   moving the portion away from the remainder of the filament to obtain the portion separated from the remainder of the filament, the separated portion forming a cane able to be drawn into an optical fibre.

2. A method according to claim 1, further comprising drawing the cane into the optical fibre.

3. A method according to claim 1, in which the energy is in the form of one or more laser beams or plasma beams applied to the filament.

4. A method according to claim 3, in which the energy is directed to at least one focal spot substantially at the surface of the filament at the desired location.

5. A method according to claim 1, in which directing energy onto the filament comprises directing energy onto two or more regions circumferentially disposed around the filament at the desired location.

6. A method according to claim 1, further comprising causing relative rotational movement between the filament and the energy while directing the energy onto the filament, in order to direct energy onto a region or regions circumferentially disposed around the filament at the desired location.

7. A method according to claim 1, in which directing energy onto the filament causes the width of the filament to decrease to zero at the desired location, thereby separating the portion from the remainder of the filament.

8. A method according to claim 1, in which directing energy onto the filament reduces the width of the filament at the desired location to greater than zero, and moving the portion away from the remainder of the filament comprises causing relative longitudinal movement between the portion and the remainder of the filament to separate the portion from the remainder of the filament at the desired location.

9. A method according to claim 8, further comprising, during the directing energy, holding the remainder of the filament with a first clamp arrangement at a first position, and holding the portion with a second clamp arrangement at a second position longitudinally spaced from the first position, and causing the relative longitudinal movement by increasing the spacing between the first clamp arrangement and the second clamp arrangement.

10. A method according to claim 8, further comprising, during the directing energy, holding one of the remainder of the filament or the portion with a clamp arrangement, and causing the relative longitudinal movement by allowing the portion to move under gravity.

11. A method according to claim 1, comprising directing energy onto the filament that is sufficient to cause softening and deformation of the glass of the filament into a necked region at the desired location.

12. A method according to claim 11, further comprising applying crimping jaws to the softened glass to aid deformation into the necked region.

13. A method according to claim 11, in which deformation of the glass into the necked region comprises collapse of the one or more lumina.

14. A method according to claim 13, in which the deformation and optionally also the moving of the portion away from the remainder of the filament cause a width of the necked region to decrease to zero, thereby closing the lumina at the separated end of the portion.

15. A method according to claim 1, in which the glass is ablated to form a circumferential slot around the filament at the desired location.

16. A method according to claim 1, further comprising removing vapour and/or debris generated by the ablation by providing a flow of air to carry vapour and/or debris away from the filament.

17. A method according to claim 1, in which the length of glass filament has been drawn from a glass preform and the method is carried out in a draw tower while the filament is being drawn from the glass preform.

18. A method according to claim 17, in which the filament is drawn from the glass preform using a cane puller comprising a pair of opposing rotating belts arranged to grip opposite sides of the filament and pull the filament in a longitudinal direction away from the preform.

19. A method according to claim 18, in which the pair of opposing rotating belts are arranged such that the axis of rotation of each belt is orthogonal to the longitudinal direction.

20. A method according to claim 18, in which the pair of opposing rotating belts are arranged such that the axes of rotation of the belts are at opposite and substantially equal non-orthogonal angles to the longitudinal direction, in order to cause rotation of the drawn filament about its longitudinal axis.

\* \* \* \* \*